United States Patent
Keogh

(10) Patent No.: US 6,180,706 B1
(45) Date of Patent: *Jan. 30, 2001

(54) CROSSLINKABLE HIGH PRESSURE LOW DENSITY POLYETHYLENE COMPOSITION

(75) Inventor: Michael John Keogh, Bridgewater, NJ (US)

(73) Assignee: Union Carbide Chemicals & Plastics Technology Corporation, Danbury, CT (US)

( * ) Notice: Under 35 U.S.C. 154(b), the term of this patent shall be extended for 0 days.

This patent is subject to a terminal disclaimer.

(21) Appl. No.: 09/098,477

(22) Filed: Jun. 16, 1998

(51) Int. Cl.⁷ .............................. C08J 3/00; C08K 5/13; C08L 23/06; H01B 7/00; H01B 11/02
(52) U.S. Cl. .............. 524/347; 174/113 R; 174/110 SR; 174/110 PM; 174/120 SR; 428/375; 428/378; 428/379; 428/383; 525/387
(58) Field of Search .................................. 428/379, 378, 428/375, 383; 174/113 R, 110 SR, 110 PM, 120 SR; 524/347; 525/387

(56) References Cited

U.S. PATENT DOCUMENTS

| | | | |
|---|---|---|---|
| 4,018,852 | 4/1977 | Schober | 260/878 R |
| 4,260,661 | 4/1981 | Walters et al. | 428/389 |
| 5,245,084 | 9/1993 | Groepper et al. | 568/558 |
| 5,292,791 | 3/1994 | Groepper et al. | 524/530 |
| 5,731,082 * | 3/1998 | Gross et al. | 428/379 |
| 5,919,565 * | 7/1999 | Gross | 428/379 |

FOREIGN PATENT DOCUMENTS

| | | |
|---|---|---|
| 0504920 | 9/1992 | (EP) . |
| 0785229 | 7/1997 | (EP) . |
| 994344 | 6/1965 | (GB) . |

OTHER PUBLICATIONS

"Macromolecules; Synthesis and Materials", 1977, pp. 866–867.*

* cited by examiner

Primary Examiner—Patrick D. Niland
(74) Attorney, Agent, or Firm—Saul R. Bresch

(57) ABSTRACT

A composition comprising:
(a) a low density homopolymer of ethylene prepared by a high pressure process;
(b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.07 part by weight of scorch inhibitor per 100 parts by weight of homopolymer;
(c) a cure booster; and
(d) an organic peroxide.

10 Claims, No Drawings

CROSSLINKABLE HIGH PRESSURE LOW DENSITY POLYETHYLENE COMPOSITION

FIELD OF THE INVENTION

This invention relates to compositions useful in the preparation of cable insulation, semiconducting shields, and jackets.

BACKGROUND OF THE INVENTION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

In many cases, crosslinking of the polymeric materials is essential to the particular cable application, and, in order to accomplish this, useful compositions generally include a polymer; a crosslinking agent, usually an organic peroxide; and antioxidants, and, optionally, various other additives such as a scorch inhibitor or retardant and a crosslinking booster. Crosslinking assists the polymer in meeting mechanical and physical requirements such as improved thermal aging and lower deformation under pressure.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Polymers containing peroxides are vulnerable to scorch (premature crosslinking occurring during the extrusion process). High pressure, low density polyethylene (HP-LDPE) is particularly vulnerable to scorch. Scorch causes the formation of discolored gel-like particles in the resin. Further, to achieve a high crosslink density, high levels of organic peroxide have been used. This leads to a problem known as sweat-out, which has a negative effect on the extrusion process and the cable product. Sweat-out dust is an explosion hazard, may foul filters, and can cause slippage and instability in the extrusion process. The cable product exposed to sweat-out may have surface irregularities such as lumps and pimples and voids may form in the insulation layer.

Industry is constantly seeking to find crosslinkable HP-LDPE compositions, which can be extruded at high temperatures (although limited by the decomposition temperature of the organic peroxide) and rates with a minimum of scorch and yet be crosslinked at a fast cure rate to a high crosslink density, all with essentially no sweat out., i.e., crystallization of the organic peroxide on the surface of the extrudate.

A substituted hydroquinone is suggested as a scorch inhibitor in U.S. Pat. No. 5,292,791 in quantities of at least 0.1 percent by weight based on the polymer. It is found, however, that this results in low crosslink densities.

DISCLOSURE OF THE INVENTION

An object of this invention, therefore, is to provide a HP-LDPE composition, which minimizes scorch and maximizes crosslink density. Other objects and advantages will become apparent hereinafter.

According to the invention, such a composition has been discovered. The composition comprises:

(a) a low density homopolymer of ethylene prepared by a high pressure process;

(b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.08 part by weight of scorch inhibitor per 100 parts by weight of homopolymer;

(c) a cure booster; and (d) an organic peroxide.

DESCRIPTION OF THE PREFERRED EMBODIMENT(S)

The low density homopolymer of ethylene prepared by a high pressure process is conventional. It is a free radical initiated polymerization conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C. The density of the homopolymer is preferably in the range of 0.910 to 0.930 gram per cubic centimeter, and the melt index can be in the range of about 1 to about 5 grams per 10 minutes and is preferably in the range of about 0.75 to about 3 grams per 10 minutes. Melt index is determined under ASTM D-1238, Condition E, at 190 degrees C. and 2.16 kilograms.

The scorch inhibitor is selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) with the proviso that the amount of scorch inhibitor is maintained within the range of about 0.02 to about 0.08, preferably about 0.04 to about 0.06, part by weight per 100 parts by weight of homopolymer. The most preferred amount of scorch inhibitor is about 0.05 part by weight. If another polymer is added to the composition, then, the amount of scorch inhibitor will be based on total polymer, but the same limitations will apply.

The substituted hydroquinone can be selected from the group consisting of a hydroquinone substituted at the 2 or the 2 and 5 positions with the same or different tertiary alkyl groups; a hydroquinone substituted at the 2 position with a tertiary alkyl group and a benzene ring sharing the double bond between the 5 and 6 positions; and two hydroquinones bridged at the 6 and 2 positions with an alkylene group having 1 to 18 carbon atoms, one hydroquinone having a tertiary alkyl group at the 2 position and the other hydroquinone having a tertiary alkyl group at the 5 position.

The cure (crosslinking) booster can be any one, or a mixture, of a broad selection of boosters. For example, it can be an ester, ether, or ketone containing at least 2, and preferably 3, unsaturated groups such as a cyanurate, an isocyanurate, a phosphate, an ortho formate, an aliphatic or aromatic ether, or an allyl ester of benzene tricarboxylic acid. The number of carbon atoms in the ester, ether, or ketone can be in the range of 9 to 40 or more, and is preferably 9 to 20. Preferred esters, ethers, and ketones are essentially non-volatile at storage temperatures, and the unsaturated groups are preferably allyl groups. Specific examples are triallyl cyanurate (TAC); triallyl-1,3,5-triazine-2,4,6(1H,3H,5H)-trione also known as triallyl isocyanurate (TAIC); triallyl phosphate; triallyl ortho formate; tetra-allyloxy-ethane; triallyl benzene- 1,3,5-tricarboxylate; diallyl phthalate; zinc dimethacrylate; ethoxylated bisphenol A dimethacrylate; methacrylate terminated monomer with average chain lenght of $C_{14}$ or $C_{15}$; pentaerythritol tetraacrylate; dipentaerythritol pentaacrylate; pentaerythritol triacrylate; dimethylolpropane tetraacrylate; ethoxylated trimethylolpropane triacrylate; trimethylolpropane triacrylate; and 2,4,6-triallyl-1,3,5-trione. Also see U.S. Pat. No. 4,018,852.

A preferred booster is triallyl trimellitate (TATM). Other preferred cure boosters are 3,9-divinyl-2,4,8,10-tetraoxaspiro [5.5]undecane (DVS), triallyl cyanurate, and triallyl isocyanurate.

The organic peroxide preferably has a decomposition temperature of 100 to 220 degrees C. for a half-life of 10 minutes and can be exemplified by the following compounds [the numbers set off by the parentheses are their decomposition temperatures (in degrees C.)]: succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di (benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy-1,4-diisopropylbenzene (160). Alpha, alpha'-bis-t-butylperoxy-1,4-diisopropylbenzene is preferred because of its high decomposition temperature although dicumyl peroxide is more commonly used.

Based on 100 parts by weight of the homopolymer of ethylene, the proportions of the compounds can be about as follows (in parts by weight):

| Component | Broad Range | Preferred Range |
|---|---|---|
| (b) scorch inhibitor | 0.02 to 0.08 | 0.04 to 0.06 |
| (c) cure booster | 0.1 to 2 | 0.2 to 0.8 |
| (d) organic peroxide | 0.3 to 3 | 0.5 to 2.5 |

It should be understood that the proportions for (c) and (d) can vary outside of the stated ranges depending on the desired properties. For example, to achieve a low dissipation factor in wire and cable applications, the amount of cure booster can be lowered and the amount of peroxide raised. Variations can also be considered for other properties such as heat aging characteristics and tensile properties. The weight ratio of scorch inhibitor to cure booster can be in the range of about 0.01:1 to about 0.8:1, and is preferably in the range of about 0.05:1 to about 0.4:1.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130 to about 260 degrees C., and preferably in the range of about 170 to about 220 degrees C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valves maintain equilibrium of the steam and water and the respective fill lengths within the steam CV tube.

Conventional additives can be added to the polymer either before or during processing. The amount of additive is usually in the range of about 0.01 to about 50 percent by weight based on the weight of the resin. Useful additives are antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, water tree inhibitors such as polyethylene glycol, and viscosity control agents.

In order to provide a semiconducting shield it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, N110, and acetylene black.

Examples of antioxidants are: hindered phenols such as tetrakis[methylene(3,5-di-tert- butyl-4-hydroxyhydrocinnamate)]methane, bis[(beta-(3, 5-ditert-butyl-4-hydroxybenzyl)-methylcarboxyethyl) ]sulphide, 4,4'-thiobis (2-tert-butyl-5-methylphenol), 2,2'-thiobis(4-methyl-6-tert-butylphenol), and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate (DSTDP); various siloxanes; and various amines such as polymerized 2,2,4-trimethyl- 1, 2-dihydroquinoline, 4, 4'-bis(alpha, alphadimethylbenzyl) diphenylamine, and alkylated diphenylamines. Antioxidants can be used in amounts of about 0.1 to about 5 percent by weight based on the weight of the composition.

Advantages of the invention are low scorch, higher useful extrusion temperatures, high crosslink density, less molecular weight degradation of copolymer, less dusting of resin due to peroxide sweat out, and, under suitable circumstances, higher throughput of wire or cable through the continuous vulcanizing oven. Another advantage relates to the solubility of the scorch retardants in the HP-LDPE. Their high effectiveness at about 0.07 part by weight and below allows use below their solubility limits. This reduces or eliminates blooming at the surface as well as crystallization in the resin matrix.

At least three methods exist for quantifying the degree of crosslinking of the resin: (i) by "hot-set"(IEC 502/540). This is accomplished by attaching a weight to the crosslinked composition in plaque form at 200 degrees C. If the elongation is at least 100 percent, the crosslink density is sufficient for industrial purposes. (ii) by decalin extractables (ASTM D 2765). The uncrosslinked polymer dissolves in the hot decalin solvent and the value is reported in percent by weight decalin extractables. A value below 30 percent and preferably less than 20 percent is judged to be acceptable. (iii) by rheometer, which checks the viscosity. The rheometer test procedure is described in U.S. Pat. No. 3,954,907. The first two methods are industry standards. The third method is a diagnostic tool particularly suitable for accurate screening and laboratory study.

The higher the extrusion temperature, the hotter the resin composition going into the CV tube to be crosslinked and, thus, the faster the cure rate, simply because the resin composition doesn't have to be heated up as much for the cure step. The maximum extrusion temperature relates to the decomposition temperature of the organic peroxide, i.e., the extrusion temperature cannot be as high as the temperature at which significant decomposition of the peroxide takes place. Thus, it is advantageous to be able to use an organic peroxide having a higher decomposition temperature if the other components of the composition of the invention will tolerate a higher extrusion temperature.

In certain polyethylene compositions, 4,4'-thiobis(2-methyl-6-t-butyl phenol) and 2,2'-thiobis(6-t-butyl-4-methylphenol) have been found to cause a color problem, which, in spite of their scorch inhibitor qualities can be commercially unacceptable. This problem is solved by adding hydroquinone or a substituted hydroquinone in a sufficient amount to inhibit color formation. Details can be found in a United States patent application filed on the same date as subject patent application by Michael J. Keogh for A Crosslinkable Polyolefin Composition (D-17874) bearing Ser. No. 09/098,476.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

It is understood that the term "decomposition temperature" as it relates to organic peroxides is the onset temperature for significant decomposition of the organic peroxide. This temperature is based on the half life temperature of the organic peroxide.

All molecular weights mentioned in this specification are weight average molecular weights unless otherwise designated.

The patents, patent application, and publication mentioned in this specification are incorporated by reference herein.

The invention is illustrated by the following examples.

EXAMPLES 1 to 9

100 parts by weight of the ethylene polymer are fluxed in a Brabender™ mixer heated to 150 degrees C. The additives, i.e., the scorch inhibitor, antioxidant, and crosslinking booster are added to the fluxed resin and mixed at a temperature of up to about 170 degrees C. during a five minute period. The resulting composition is cooled and transferred to a heated two roll mill where the peroxide is added and blended at a temperature below 130 degrees C. for three minutes. The hot sheeted peroxide composition is then fed to a granulator to provide a granulated product for use in the examples. Variables and results are set forth in the Table. Amounts of components are given in parts by weight.

TABLE

| Example | 1 | 2 | 3 | 4 | 5 | 6 | 7 | 8 | 9 |
|---|---|---|---|---|---|---|---|---|---|
| HP-LDPE | 100 | 100 | 100 | 100 | 100 | 100 | 100 | 100 | 100 |
| A/O I | 0.2 | 0.2 | 0.13 | 0.13 | 0.15 | 0.13 | 0.13 | 0.13 | 0.05 |
| A/O II | 0.2 | 0.2 | 0.2 | 0.2 | 0.2 | 0.2 | 0.2 | 0.2 | 0.2 |
| scorch inhibitor I | — | — | 0.07 | 0.07 | — | — | — | — | — |
| scorch inhibitor II | — | — | — | — | 0.05 | 0.05 | — | — | — |
| scorch inhibitor III | — | — | — | — | — | — | 0.07 | 0.07 | 0.15 |
| cure booster | — | 0.40 | — | 0.40 | — | 0.40 | — | 0.40 | 0.40 |
| dicumyl peroxide | 1.80 | 1.40 | 1.90 | 1.50 | 1.80 | 1.50 | 1.90 | 1.50 | 1.50 |
| Tests | | | | | | | | | |
| rheometer (lbs-inches) | 45 | 49 | 46 | 48 | 46 | 47 | 44 | 42 | 21 |
| scorch (minutes) | 1.46 | 1.28 | 1.62 | 1.65 | 1.55 | 1.52 | 1.65 | 1.68 | 2.03 |
| efficiency | 18.6 | 17.8 | 22.7 | 25.9 | 22.6 | 24.2 | 23.0 | 24.7 | — |

Notes to Table:
1. HP-LDPE is a high pressure, low density homopolymer of ethylene. It has a density of 0.92 gram per cubic centimeter and a melt index of 1.8 grams per 10 minutes.
2. A/O I is the antioxidant thiodiethylene bis(3,5-di-tert-butyl-4-hydroxy hydrocinnamate).
3. A/O II is the antioxidant distearyl thiodipropionate
4. Scorch inhibitor I is 4,4'-thiobis(2-methyl-6-t-butylphenol). It is noted that this compound is a superior scorch inhibitor; melt blends with the resin during compounding and extrusion; and does not crystallize in the polymer matrix.
5. Scorch inhibitor II is 4,4'-thiobis(2-t-butyl-5-methylphenol).
6. Scorch inhibitor III is a substituted hydroquinone, i.e., 2,5-di-tert-amyl hydroquinone.
7. The cure booster is 3,9-divinyl-2,4,8,10-tetra-oxaspiro[5.5]undecane (DVS).
8. Rheometer (lbs-inches) is measured in accordance with the test described in U.S. Pat. No. 3,954,907.
9. Scorch (minutes) and efficiency are also measured in accordance with the test described in U.S. Pat. No. 3,954,907.

What is claimed is:

1. A composition comprising:
   (a) a low density homopolymer of ethylene prepared by a high pressure process;
   (b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.08 part by weight of scorch inhibitor per 100 parts by weight of homopolymer;
   (c) a cure booster; and
   (d) an organic peroxide.

2. The composition defined in claim 1 wherein the weight ratio of component (b) to component (c) is about 0.01:1 to about 0.8:1.

3. The composition defined in claim 1 wherein the substituted hydroquinone is selected from the group consisting of a hydroquinone substituted at the 2 or the 2 and 5 positions with the same or different tertiary alkyl groups; a hydroquinone substituted at the 2 position with a tertiary alkyl group and a benzene ring sharing the double bond between the 5 and 6 positions; and two hydroquinones bridged at the 6 and 2 positions with an alkylene group having 1 to 18 carbon atoms, one hydroquinone having a tertiary alkyl group at the 2 position and the other hydroquinone having a tertiary alkyl group at the 5 position.

4. The composition defined in claim 1 wherein the scorch inhibitor is present in an amount of about 0.04 to about 0.06 part by weight based on 100 parts by weight of homopolymer.

5. The composition defined in claim 1 wherein the cure booster is present in an amount of about 0.1 to about 2 parts by weight based on 100 parts by weight of homopolymer.

6. The composition defined in claim 1 wherein the organic peroxide is present in an amount of about 0.3 to about 3 parts by weight based on 100 parts by weight of homopolymer.

7. The composition defined in claim 1 wherein, for each 100 parts by weight of homopolymer, the other components are present as follows:
   (b) about 0.04 to about 0.06 part by weight of scorch inhibitor;
   (c) about 0.2 to about 0.8 part by weight of cure booster; and
   (d) about 0.5 to about 2.5 parts by weight of organic peroxide.

8. The composition defined in claim 5 wherein the cure booster is triallyl trimellitate; 3,9-divinyl-2,4,8,10-tetra-oxaspiro undecane; triallylcyanurate; or triallylisocyanurate.

9. A cable comprising one or more electrical conductors or a core of electrical conductors, each conductor or core being surrounded by a composition comprising:
   (a) a crosslinked low density homopolymer of ethylene prepared by a high pressure process;
   (b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.08 part by weight of scorch inhibitor per 100 parts by weight of homopolymer; and
   (c) A cure booster.

10. A process for extrusion comprising extruding around one or more electrical conductors or a core of electrical conductors, at a temperature below the decomposition temperature of the organic peroxide, a composition comprising
   (a) a low density homopolymer of ethylene prepared by a high pressure process;
   (b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.08 part by weight of scorch inhibitor per 100 parts by weight of homopolymer;
   (c) a cure booster; and
   (d) an organic peroxide, and curing the extrudate.

* * * * *